Patented Sept. 18, 1934

1,974,273

UNITED STATES PATENT OFFICE 1,974,273

MANUFACTURE OF ARTIFICIAL FILAMENTS

Hugo Hofmann, Johnson City, Tenn., assignor to American Bemberg Corporation, New York, N. Y., a corporation of Delaware No Drawing. Application September 20, 1932, Serial No. 634,017

3 Claims. (Cl. 18—54)

My present invention concerns a new and novel method for preparing cuprammonium spinning solutions.

In the manufacture of artificial silk, bands, films, and the like, several classes of materials may be utilized as the solution from which the filaments, films, etc., are to be spun or extruded.

The present invention has for its object a new process whereby one type of spinning solution, namely a copper-oxide-ammonia, or cuprammonium, spinning solution may be prepared.

Another object is to provide a novel and simple method for the production of cuprammonium solutions whereby the consumption of ammonia is brought practically to a minimum.

Other objects will become apparent from a study of the following specification and claims.

In the manufacture of artificial silk, films, etc., by the cuprammonium process, the three necessary ingredients of the solution are copper, ammonia, and cellulose. The copper and ammonia act to place the cellulose in solution. An excess of ammonia has always been necessary in order to dissolve the cellulose, and hitherto the relationship of the amounts of copper and ammonia used in the preparation of the solution has always called for large excesses of ammonia. From a strictly theoretical standpoint, the ratio should be 63:68, that is, one mol of copper to two mols of ammonia ($NH_3$). That is to say, whereas it is the usual process to employ 4, 6 or 8 mols of ammonia for one mol of copper, the theoretical amount necessary is, as pointed out, 2 mols of ammonia for one mol of copper. If my new process is followed, the wasting of this excess of ammonia which has hitherto been employed is practically eliminated.

I have found that by the use of a low temperature and a vacuum the excess of ammonia present in the solution may be driven off, yet the viscosity of the solution is not impaired in any way. For example, if a higher temperature, such way. For example, if a higher temperature, such as 100° C. is used, the copper becomes precipitated as copper oxide, a black solid. Upon cooling from this high temperature, the viscosity of the solution is found to have been impaired. According to my new process a temperature of approximately 30° C. is used together with a vacuum. This causes the excess of ammonia to be driven off, and at the same time has no bad effect upon the viscosity of the solution, and does not tend to produce copper oxide. When following my process, I have found that the constituents of the final solution closely approximate the theoretical amount of one mol of copper to 2 mols of ammonia.

Therefore, through the use of the temperature indicated and a lowering of the pressure on the solution, I have been able to recover approximately all of the excess of ammonia formerly used.

Hitherto, it has been necessary to spin cuprammonium filaments into heated baths, or into funnels through which heated solutions flowed. The temperature of the bath is usually about 105° C. When the excess of ammonia is removed from the cuprammonium solution, in the manner set forth above, I find that a cold bath may be employed and very good results obtained. Therefore, since the water to be used need not be heated, a great saving of heat is effected. According to my new process, I use a bath of approximately 70° C., i. e. approximately ⅔ as warm as the bath hitherto employed.

The presence of ammonia in the water leaving the funnels tends to keep the copper in solution, and when the excess of ammonia is removed according to my new process, I have found that the copper is more easily recovered from the waste coagulating solution.

As an example of the manner in which my process may be carried out, I make up the cuprammonium spinning solution in the ordinary manner employing the usual excess of ammonia. This solution is then placed in a water-jacketed vessel, and a temperature of from 25 to 35° C. maintained in the water jacket. A vacuum is applied and the excess of ammonia is thus removed. The resulting solution after this treatment is found to possess a practically unchanged viscosity and to comprise only approximately 2 mols of ammonia for one mol of copper. This solution thus prepared is spun in the ordinary funnels into a precipitating liquid, the temperature of which may vary between 60 and 75° C. The absence of an excess of ammonia does away with the necessity of a heated solution and also makes the copper which is acquired by the spinning solution more easily recovered.

Having now set forth my invention as required by the patent statutes, what I desire to claim is:

1. In the process of producing artificial silk filaments the steps including dissolving cellulose in a cuprammonium solution containing at least four mols of ammonia for one mol of copper, reducing the ammonia content of said cuprammonium solution to approximately two mols of ammonia for one mol of copper to form a cellulosic spinning solution and subsequently extruding said spinning solution into a coagulating bath maintained at temperatures varying between 60 to 75° C.

2. In the process of producing artificial silk filaments the steps including dissolving cellulose in a cuprammonium solution containing at least four mols of ammonia for one mol of copper, reducing the ammonia content of said cuprammonium solution in vacuo to approximately two mols of ammonia for one mol of copper to form a cellulosic spinning solution and subsequently extruding said spinning solution into a coagulating bath maintained at temperatures varying between 60 to 75° C.

3. In the process of producing artificial silk filaments the steps including dissolving cellulose in a cuprammonium solution containing at least four mols of ammonia for one mol of copper, reducing the ammonia content of said cuprammonium solution in vacuo at about 25 to 35° C. to approximately two mols of ammonia for one mol of copper to form a cellulosic spinning solution and subsequently extruding said spinning solution into a coagulating bath maintained at temperatures varying between 60 to 75° C.

HUGO HOFMANN.